United States Patent [19]

Crespin et al.

[11] Patent Number: 4,681,495
[45] Date of Patent: Jul. 21, 1987

[54] DEVICE AND PROCESS FOR FIXING TWO PARTS WITH A CAPTIVE SCREW

[75] Inventors: Gérard Crespin, Villeurbanne; Jean Coussau, Paris, both of France

[73] Assignee: Framatome & Cie, Courbevoie, France

[21] Appl. No.: 666,022

[22] Filed: Oct. 29, 1984

[30] Foreign Application Priority Data

Oct. 23, 1983 [FR] France ................. 83 17279

[51] Int. Cl.⁴ ........................................ F16B 39/22
[52] U.S. Cl. .................................. 411/298; 411/21; 411/348; 411/941.3
[58] Field of Search ............. 411/21, 45, 297, 298, 411/266–270, 347, 348, 446–448, 549–553, 941.3

[56] References Cited

U.S. PATENT DOCUMENTS

| | | | |
|---|---|---|---|
| 3,180,390 | 4/1965 | Ockert, Jr. | 411/348 |
| 4,507,034 | 3/1985 | Lew et al. | 411/21 |

FOREIGN PATENT DOCUMENTS

| | | | |
|---|---|---|---|
| 35095 | 9/1981 | European Pat. Off. | 411/45 |
| 377338 | 12/1939 | Italy | 411/294 |
| 456096 | 2/1975 | U.S.S.R. | 411/21 |

*Primary Examiner*—Gary L. Smith
*Assistant Examiner*—Neill Wilson
*Attorney, Agent, or Firm*—Pollock, Vande Sande & Priddy

[57] ABSTRACT

A device and process for fixing two parts with a captive screw (5) engaged in a threaded hole (3) machined in at least one of the two parts (1,2). The screw (5) comprises over its whole length a bore (6) communicating with at least one radially directed hole (10) opening out on the outer side surface of the screw (5) in its threaded part (5a) and enclosing a component (11) movable in the hole (10). A maneuvering rod (14) is engaged in the bore (6) for locking the screw (5) in place in the threaded hole (3), by placing a part of the rod with larger diameter to coincide with the component (11) which then crushes the threading of the part (3a) of the hole (3). The rod (14) is crimped over the screw (5) by virtue of strips (18). The disclosure applies in particular to the assembly of two walls of a partitioning of the core of a pressurized water nuclear reactor.

4 Claims, 5 Drawing Figures

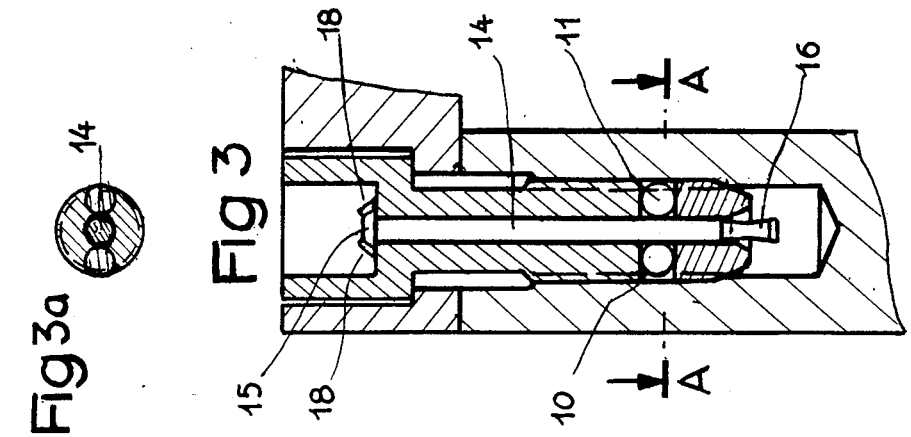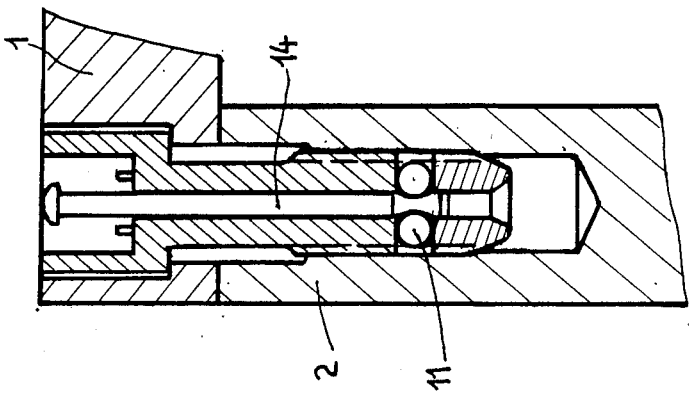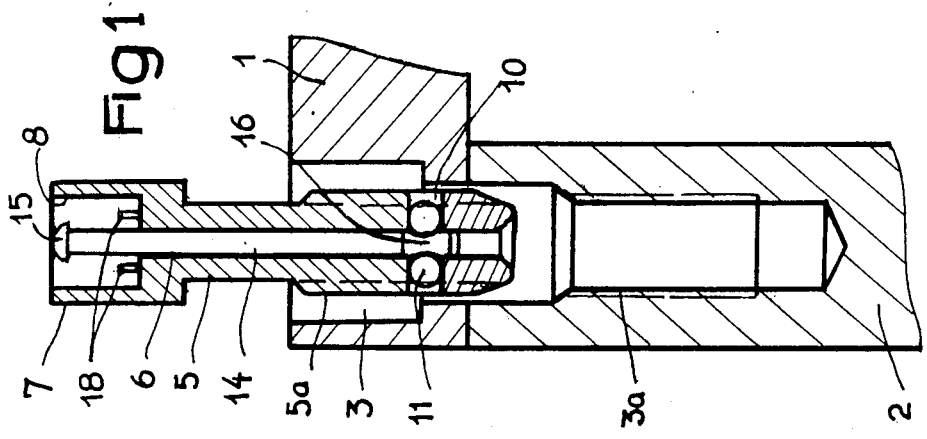

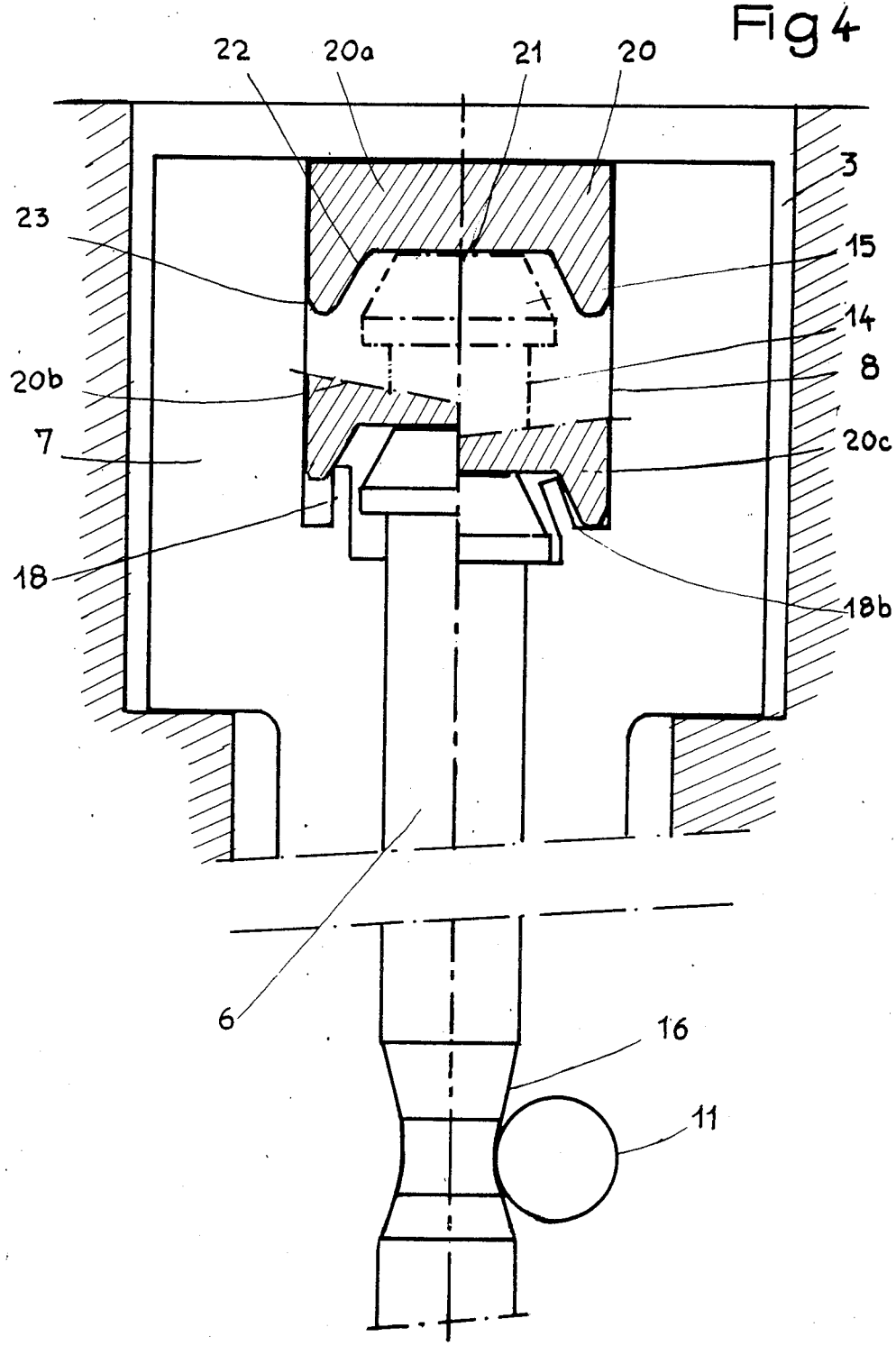

DEVICE AND PROCESS FOR FIXING TWO PARTS WITH A CAPTIVE SCREW

BACKGROUND OF THE INVENTION

The invention relates to a device for fixing two parts with a captive screw and the corresponding fixing process.

In pressurized water nuclear reactors, the core consists of a group of prismatic fuel assemblies arranged vertically and side by side and generally surrounded by a peripheral partitioning which matches the outer shape of the core. This partitioning makes it possible in particular to hold the core assemblies and to channel water under pressure toward the base of the core before it passes upwards through the latter. The partitioning of the core of a pressurized water nuclear reactor generally comprises a set of vertical plates assembled at right angles and holding devices consisting of horizontal plates cut out in accordance with the shape of the core section and inserted between the set of vertical partitioning plates and the core enclosure.

During the operation of the reactor, interstices can appear between the vertical plates forming the partitioning wall, with the result that water under pressure can pass in the form of jets from the space situated between the core enclosure and the partitioning into the volume occupied by the core and bounded by the partitioning. In fact, there is a difference in the pressure of the cooling water between the outside and the inside of the core, produced by the pressure drop inside the assemblies forming the core. The pressurized jets directed from the exterior to the interior of the core cause vibrations of the rods in the peripheral assemblies of the reactor core, which are highly damaging to the behavior of these assemblies in service, the damage being capable of extending even to a rupture of fuel rods.

PRIOR ART

French Patent Application No. 81/14,899, filed by applicants, discloses a process and a device for eliminating leakage spaces between the partitions surrounding the core of a pressurized water nuclear reactor.

This process consists in uniting the partitions in pairs by a set of screws passing through and bearing on one of the partitions and screwed inside a threaded hole made in the other partition.

It is highly important that these screws should be made in the form of captive screws which are not liable to stray under the effect of vibrations during the operation of the reactor and to be swept along by the pressurized cooling water.

Devices for braking screws with washers or by keying are known, but these known devices do not provide absolute safety and are difficult to use in the case of a screw introduced inside the partitions of the core of a nuclear reactor.

A fixing device with distorted threads, described in French Pat. No. 1,478,075, is also known, in which the displacement of a ball inside a bore provided in the screw permits the distortion of the threaded part of this screw in a radial direction. This unsymmetrical distortion of the screw makes it possible to produce a locking in rotation of the latter inside a threaded hole in which it is engaged. However, such a device does not provide absolute safety in the case of the partitions in a nuclear reactor, since in the event of a rupture of the screw, the part of it which includes the head can come away from the partition. This rupture can be caused by mechanical or thermal stresses in the nuclear reactor or by irradiation conditions. The fact that the screw thread is distorted can moreover reduce its mechanical strength.

SUMMARY OF THE INVENTION

The aim of the invention is therefore to offer a device for fixing two parts with a captive screw, comprising a screw engaged over a part of its length in a threaded hole machined in at least one of the two parts and a means for locking the screw in the threaded hole which is movable inside the screw, this fixing device being characterized by very high safety and being capable of being installed easily in the partitioning of a nuclear reactor which has already operated, in particular by using the device described in French Pat. No. 81/14,899.

To this end, the screw comprises over its whole length, and along its axis, a bore communicating with at least one radially directed hole opening out on the outer side surface of the screw in its threaded part and enclosing a component movable in the hole whose size in the radial direction is substantially equal to the maximum thickness of the tubular wall of the screw in its threaded part, and the device in addition comprises a maneuvering rod engaged with a very small radial clearance in the bore of the screw, comprising a head with a diameter appreciably larger than the diameter of the bore at one of its ends resting outside the bore and a part with a reduced diameter at its other end arranged opposite the hole enclosing the means for locking, when the maneuvering rod is in a first position or out-of-service position. Locking of the screw is obtained by an axial movement of the maneuvering rod inside the bore into a locking position, bringing a part of this rod with unreduced diameter in contact with the locking component which is moved radially so as to distort by compression at least one thread of the threaded hole in which the screw is engaged. The screw additionally comprises distortable parts in the region of the head of the maneuvering rod in its locking position, for crimping this rod on the screw.

BRIEF DESCRIPTION OF THE DRAWINGS

In order that the invention may be properly understood, a description will now be given, by way of non-limiting example, of an embodiment of a fixing device according to the invention applied to the case of a partition of the core of a pressurized water nuclear reactor.

FIG. 1 shows a sectional view of the fixing device at the instant of its entry into the hole machined in the partitions.

FIG. 2 is a sectional view of the fixing device screwed inside the threaded hole in the partitions but not locked.

FIG. 3 is a sectional view of the fixing device in its screwed and locked position inside the threaded hole arranged in the partitions.

FIG. 3a is a sectional view along line A—A of FIG. 3.

FIG. 4 is a sectional view showing the various positions of a tool for screwing and crimping inside the head of a screw as shown in FIGS. 1, 2 and 3, during the locking of the fixing device.

DETAILED DESCRIPTION

FIG. 1 shows the assembled partitions 1 and 2 in which there is machined a hole 3 threaded over a part 3a of its length inside the partition 2. Inside the partition 1 the hole has a widening ending in a shoulder intended to receive the head of the screw. The screw 5 comprises a threaded part 5a corresponding to the threaded part 3a of the hole inside the partition 2. The screw 5 is pierced by an axial bore 6 over its entire length and has a head 7 of a large diameter. The head 7 comprises an opening 8 of a prismatic shape with a hexagonal cross-section for engaging a screwing tool.

Two radially directed holes 10 communicate with the central bore 6 of the screw at one of their ends and open out at their other end on the threaded outer side surface 5a of the screw. Inside each of the holes 10 is arranged a ball 11 whose diameter, as can be seen in FIG. 3a, is substantially equal to the maximum thickness of the tubular wall of the screw in its threaded part 5a.

The edges of the holes 10, in the place where these holes open out on the external side surface of the screw, are bent slightly inwards to retain the balls 11 inside the corresponding holes 10.

Inside the bore 6 of the screw is arranged a rod 14 engaged practically without clearance in this bore. The rod 14 has a head 15 whose diameter is appreciably greater than the diameter of the bore 6 and a part with reduced diameter 16, which can be seen on a larger scale in the lower part of FIG. 4, at its end opposite the head 15.

The reduced diameter part 16 is connected to the unreduced diameter part of tje stem by a frusto-conical surface. The part with reduced diameter is of a toric shape permitting it to be placed in contact with the balls 11 when the stem 14 in its position shown in FIG. 1 or in the lower part of FIG. 4. In this out-of-service position of the stem, the balls can come into a position of withdrawal in the radial direction during the screwing of the screw 5 which causes the inward movement of the balls 11 pushed by the threads of the threaded part 3a of the hole 3. A collar 18 machined from the metal of the screw and easily distortable is provided inside the opening 8 of the head of the screw 7.

The screw is installed in position and screwed inside the threaded hole 3 with a tool whose outer profile corresponds to the profile of the opening 8 in the screw head.

After the end of screwing, the screw is in its position shown in FIG. 2 where it ensures the closing of the interstice between the partitions 1 and 2.

The locking of the screw as shown in FIGS. 3 and 3a is then carried out by using the tool 20 for screwing and crimping shown in FIG. 4. This crimping tool 20 is designed so as to be capable of being adapted on a device such as described in French Patent Application No. 81/14,899 of July 30, 1981. As indicated, it comprises a prismatic outer surface with a shape corresponding to the shape of the opening 8 in the screw head 7. Its lower part comprises a flat bearing surface 21, a frusto-conical bearing 22 and a chamfer 23, making it possible to facilitate its entry into the opening 8 of the screw head 7.

At the end of screwing, the screw being in its FIG. 2 position an axial push is applied to the tool 20 by virtue of the device described in Pat. No. 81/14,899, so that the bearing surface 21 comes into contact with the head 15 of the maneuvering rod 14 and this rod is pushed toward the bottom of the threaded hole 3. The entry movement of the maneuvering rod brings a part of the stem with unreduced diameter opposite the balls 11 with the result that the latter are moved radially outwards as shown in FIG. 3.

During their movement under the pressing force exerted on the rod, the pressure on the balls is exerted by the frusto-conical gradient situated at the end of the reduced diameter zone. The radial advance of the balls outwards produces a crushing of the threads of the threaded part 3a of the hole 3, which causes locking of the screw in rotation and in translation. The tool 20 is then moved from the position 20a to the position 20b shown in FIG. 4. In its position 20b the tool comes into contact through its frusto-conical part 22 with the distortable parts 18 of the screw head 7. By continuing the movement of the tool 20 until the instant when the head 15 of the maneuvering rod 14 comes into contact with the bottom of the opening 8 in the screw head, a folding back of the distortable parts 18 is produced until they are brought into a reversed position 18b in which they hold the head 15 of the maneuvering rod against the bottom of the opening in the screw head. The fixing device is then in its locking position shown in FIG. 3.

In this position the screw is not only locked in rotation and in translation but is also fixed relative to the partitions 1 and 2 in a completely safe manner even in the case of a rupture of the screw, since the rod 14 continues to hold the screw and prevents it from becoming a body migrating in the reactor cooling water.

The locking of the screw has been produced without distortion of this screw but simply by crushing the thread of the threaded hole in one of the partitions over a very small area corresponding to the area of contact with the ball. The balls are held in a locking position by the rod which is itself crimped on the screw.

The operations of installing and locking the screw are produced by straightforward screwing and by a single push on a rod. These operations can be easily carried out with the tool described in Patent Application No. 81/14,899 of July 30, 1981. In particular, these operations will be carried out under water from a location above the reactor pool.

It should be understood that the embodiment described is not limiting in any way and that it is possible to modify points of detail without departing from the scope of the invention.

Thus, the means for locking the screw can be different from spherical parts such as the balls 11 which have been described, e.g., small cylinders with a rounded end or any other suitable shape. The reduced diameter zone of the maneuvering rod can have any shape whatever which facilitates placing the maneuvering rod in a locking position.

The screw can have a single hole such as 10 capable of receiving a means for locking, two holes arranged facing each other as in the embodiment which has been described, or even three or more holes placed in regularly spaced angular positions around the axis of the screw.

The fixing device according to the invention can be employed outside the field of eliminating leakage spaces in the partitioning of a pressurized water nuclear reactor.

What is claimed is:

1. Device for permanently fixing two parts (1, 2) together, comprising a captive screw engaged over a part of its length (3a) in a threaded hole (3) machined in one of the two parts (1, 2) and a means (11) for locking said screw in said threaded hole (3), which locking means is movable inside said screw, in which said screw (5) comprises over its entire length and along its axis a bore (6) communicating with at least one radially directed hole (10) opening out on an outer side surface of a threaded part (5a) of said screw (5) and enclosing said locking means (11), said locking means being movable in said hole (10) and having a size in the radial direction substantially equal to the maximum thickness of a tubular wall of said screw (5) in its threaded part (5a), and a maneuvering rod (14) engaged without substantial clearance in said bore (6) and comprising, at one of its ends outside said bore, a head (15) having a diameter larger than the diameter of said bore (6) and, at its other end, a part having a reduced diameter (16) facing the hole (10) enclosing said locking means (11) when said maneuvering rod (14) is in a first, out-of-service position, locking of said screw (5) being obtained by axial movement of said maneuvering rod (14) inside said bore into a locking position, said axial movement bringing a part of said rod (14) having an unreduced diameter in contact with said locking means (11), which is thereby moved radially so as to distort by compression at least one thread of said threaded hole (3), said screw (5) additionally comprising distortable parts (18) in the region of said head (15) of said maneuvering rod (14) for crimping said rod (14) in its locking position on said screw.

2. Fixing device as claimed in claim 1, wherein said locking means consists of a ball of a diameter which is substantially equal to the thickness of said tubular wall of said screw (5) in its threaded part (5a).

3. Fixing device as claimed in claim 1 or 2, wherein said screw has two radially directed holes (10) located in the extension of each other.

4. Fixing device as claimed in claim 2, wherein said reduced-diameter part (16) of said maneuvering rod (14) has an outer surface of a toric shape connected to the part of the rod with unreduced diameter (14) by frusto-conical surfaces.

* * * * *

UNITED STATES PATENT AND TRADEMARK OFFICE
CERTIFICATE OF CORRECTION

PATENT NO. : 4,681,495

DATED : July 21, 1987

INVENTOR(S) : Gerard Crespin and Jean Coussau

It is certified that error appears in the above-identified patent and that said Letters Patent is hereby corrected as shown below:

On the Title Page, Item [30] Foreign Application Priority Data
"Oct, 23, 1983" should read --Oct. 28, 1983--.

Signed and Sealed this

Nineteenth Day of April, 1988

Attest:

DONALD J. QUIGG

*Attesting Officer*  *Commissioner of Patents and Trademarks*